United States Patent
Geisthoff

[11] 3,889,980
[45] June 17, 1975

[54] THREE-POINT ATTACHMENT DEVICE PARTICULARLY FOR A TRACTOR

[75] Inventor: Hubert Geisthoff, Dohmar, Donrath, Germany

[73] Assignee: Jean Walterscheid GmbH, Lohmar, Rhineland, Germany

[22] Filed: Mar. 13, 1974

[21] Appl. No.: 450,876

[30] Foreign Application Priority Data
Mar. 13, 1973 Germany.......................... 23123800

[52] U.S. Cl. ............................ 280/461 A; 172/449
[51] Int. Cl. .............................................. B60d 1/16
[58] Field of Search............ 280/461 A, 460 A, 415; 172/449, 448, 439

[56] References Cited
UNITED STATES PATENTS

| | | | |
|---|---|---|---|
| 3,220,751 | 11/1965 | Tweedale | 280/461 AX |
| 3,384,937 | 5/1968 | Muncke | 172/439 U |
| 3,795,415 | 3/1974 | Koch | 280/460 AX |

Primary Examiner—Leo Friaglia
Assistant Examiner—R. Schrecengost
Attorney, Agent, or Firm—Edmund M. Jaskiewicz

[57] ABSTRACT

A three-point tractor hitch comprising an upper guide member and two lower guide members spaced therebelow has a coupling hook pivotally mounted on the upper guide member and also axially adjustable with respect to the upper guide member. The lower guide members are also provided with coupling hooks and are resiliently spaced but relatively movable with respect to the upper coupling hook.

18 Claims, 10 Drawing Figures

THREE-POINT ATTACHMENT DEVICE PARTICULARLY FOR A TRACTOR

The present invention relates to a three-point hitch for tractors, more particularly, to the linkage connecting the upper and lower guide members and to the mounting of the coupling hooks.

One form of a three-point hitch used on tractors for coupling agriculture machines and the like to the tractor comprises an upper guide member of variable length and a pair of lower guide members positioned below the upper guide member. The lower guide members are operatively connected by a lift to a power drive and both the lower and upper guide members are interconnected by a linkage. Coupling hooks of the lockable type are provided on the guide members.

In such a three-point hitch, the upper and lower guide members are fixed in position with respect to each other by the interconnecting linkage. A pivot lever is connected between the linkage and the upper guide member and the upper coupling hook is mounted so as to be axially positionable. The linkage vertically adjusts the hitch to correspond to different heights of the fastening devices on the machinery. The upper guide coupling hook is mounted to move in a circle. (German AS 1 557 667)

A disadvantage of this hitch construction is that the linkage is locked in position and cannot be expanded nor contracted during the coupling of the tractor to a machine. The linkage must therefore be precisely adjusted prior to the coupling operation.

During coupling, the upper fastener device on the machine is first engaged by the coupling hook on the upper guide member. As the coupling hook is being withdrawn toward the tractor, the pivot lever will pivot upwardly to initially raise and then lower the machine being coupled. This is disadvantageous in that the distance of the lowering movement is greater than the distance by which the machine is initially lifted because locking engagement between the upper coupling hook and the attachment device on the machine occurs only after the lowering movement has been fully completed. As a result, the coupling hook will again move further away from the upper fastening point on the machine because there is no assurance that a reliable locking engagement of the upper coupling hook has occurred.

A further disadvantage is that the upper guide member coupling hook on the hitch approaches the machine under a hydraulic drive while the withdrawal of the hook is brought about by spring force. If during the initial approach of the hook the pivot lever exceeds its 90° position with respect to the axis of the coupling hook, the entire weight of the machine to be coupled must be supported by the spring which may cause a sagging. Further, the linkage interconnecting the upper and lower guide members and the connections between the pivot lever and the linkage are subjected to the load of the entire weight of the machine being coupled. Thus, any structure provided for locking the linkage in various positions must be made to very precise standards and to withstand high stresses.

The triangular arrangement of the linkage is also disadvantageous since the space between the upper and lower guides is significantly reduced. Further, the upper coupling hook is rigidly secured to the upper guide by means of a piston-cylinder unit which does not permit any lateral movement of the hook. Such lateral movement is indeed preferred since it considerably facilitates the coupling of the upper coupling hook to the upper fastener device on the machine to be coupled.

Another disadvantage is that the openings of all the coupling hooks must be directed upwardly and there must therefore be an upwardly directed movement since the upper guide coupling hook must lift the machine being coupled. Optional manual coupling is not possible since such coupling requires lifting of the machine and this invariably involves the hydraulic actuation of the upper guide member coupling hook.

The rigid connection between the upper and lower guide members is also disadvantageous during the uncoupling of the three-point hitch from the working machine, since while the lower coupling hooks can be unlocked manually unlocking of the upper coupling hooks will depend upon the magnitude of the extension of the hook. Further, the rigid connection between the upper and lower guides is disadvantageous during the coupling operation since the approach of the upper coupling hook to the fastener device on the machine will necessitate transmitting the full lifting force of the lift device to the machine with the result that the machine may overturn because the hydraulic control is not sufficiently sensitive.

It is therefore the principal object of the present invention to provide a novel and improved three-point hitch for tractors which embodies a simple construction and which relieves the linkage connecting the upper and lower guide members of all coupling forces.

It is another object of the present invention to provide a three-point hitch which does not require a precise adaptation to the vertical distance between the fastener devices on a machine to be coupled and which provides for a secure locking engagement between the upper coupling hook and the working machine during the initial stage of the coupling operation.

It is a further object of the present invention to provide such a three-point hitch which permits optional manual coupling.

It is an additional object of the present invention to provide such a three-point hitch which can be readily disengaged without requiring the operator of the tractor to leave his seat even if the machine is resting on an inclined surface or is exerting a traction force on the tractor.

It is still another object of the present invention to provide such a three-point hitch which, during the coupling operation, will not subject the machine being coupled to forces transmitted by the lift device of the lower guides which might overturn the machine.

According to one aspect of the present invention a three-point hitch for a tractor may comprise an upper guide member of variable length, a pair of lower guide members below the upper guide member and linkage means interconnecting the upper and lower guide members. Coupling hooks are provided on each of the guide members and the upper guide member hook is pivotally mounted. Means are further provided for resiliently supporting the upper hook in spaced but relatively movable relationship to the lower guide members.

Other objects and advantages of the present invention will be apparent from the accompanying description when taken in conjunction with the following drawings, which are exemplary, wherein.

Proceeding next to the drawings wherein like reference symbols indicate the same parts through the various views a specific embodiment and modification of the present invention will be described in detail.

Figure 1:
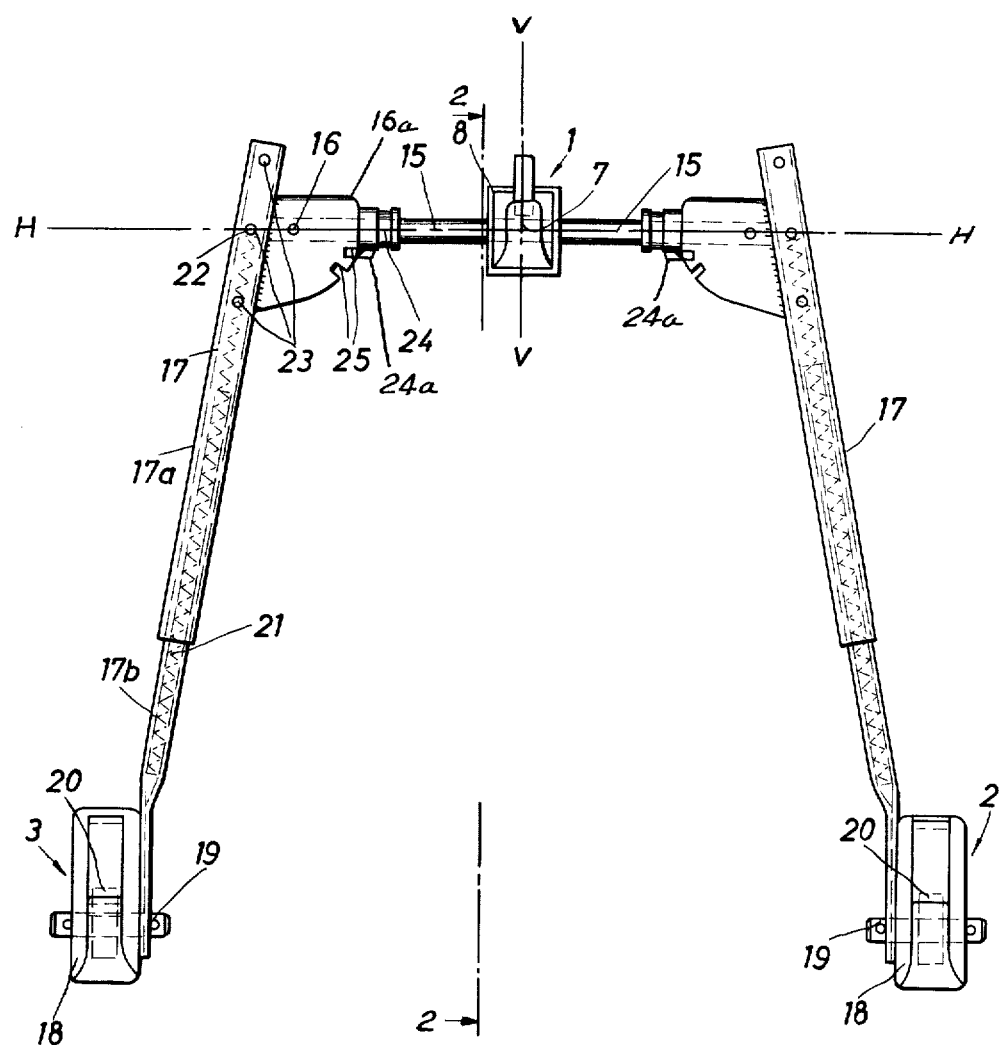
FIG. 1 is an end elevational view of the linkage of a hitch according to the present invention.

As may be seen in FIGS. 1-4, the three-point hitch comprises an upper guide member 1 and parallel spaced lower guide members 2, 3 positioned below the upper guide member. The end of upper guide member 1 is provided with a spherical member 6, having an eye 4 therethrough, and secured thereto by a spindle shaft. A bolt 5 extends through eye 4. A coupling hook 7 is attached to the remote end of a tubular slide member 8 slidably mounted on a short tubular carrier or support 10 within which is disposed spherical member 6. The slide member 8 is provided with guide slots 9 on both sides within which bolt 5 is free to slide. Hook 7 is thus capable of universal movement limited only by the dimensions of the several parts, since hook 7 can pivot about vertical and horizontal axes VV and HH respectively and can rotate around the longitudinal axis LL of slide 8 which is parallel to the longitudinal axis of the tractor. The slide member 8 is longitudinally adjustable with respect to the carrier 10 and can be fixed in one of several positions by means of a locking hook 11. The locking hook 11 extends through a slot 11a in the tubular slide member 8 and is engageable with a notch 11b in support 10 in which position the coupling hook can withstand traction stresses only. A second notch, which is not shown, is provided such that when engaged by locking lever 11 the coupling hook can withstand both traction and thrust stresses. The guiding of the upper coupling hook into one of these fixed positions occurs merely by further reversing of the tractor after the coupling hook has been lockingly engaged with the corresponding fastening device on the machine. These different types of fixed locking positions are desirable since some working machines attached to the tractor are merely carried by a three-point connection, whereas other machines, such as a plow involve thrust forces during operation.

When the locking hook is disengaged, a spring 32 urges the slide member 8 together with a coupling hook 7 away from the tractor and toward the machine to be coupled. The spring 32 is positioned between the slide member 8 and the carrier 10 to move the upper coupling hook 7 into the extended position.

The carrier can also be rigidly mounted onto the upper guide member, if so desired and in this construction the carrier and tubular slide member are provided with a cylindrical section to allow relative rotation therebetween.

The adjustment of the upper guide member coupling hook in the longitudinal direction facilitates the coupling operation particularly in the situation where the fastener devices on the machine are not at an approximate right angle with respect to the longitudinal axis of the tractor but are on a plane inclined thereto.

Figure 4:
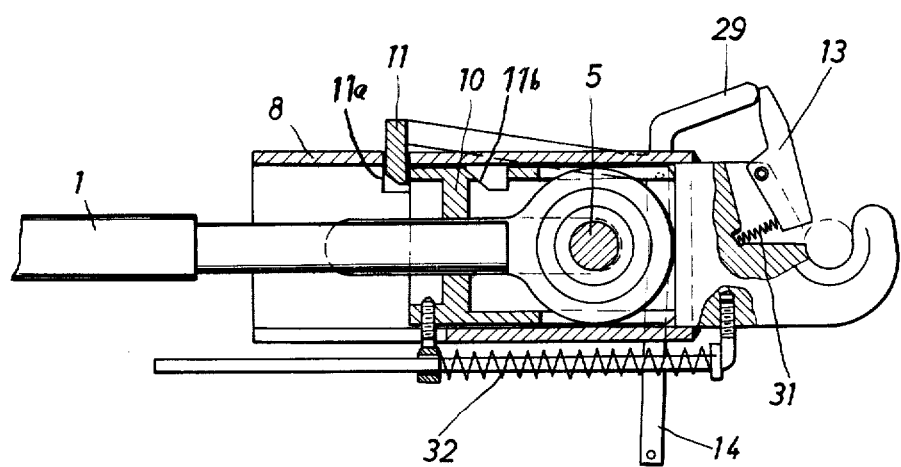
FIG. 4 is a longitudinal sectional view through the coupling hook assembly and mounting structure on the upper guide member.

The opening of the coupling hook 7 is indicated at 12 and can be closed by a locking element 13 urged into locking position by a spring 31. The locking hook 11 is positioned on one end of a crank lever 14 pivotally mounted at 14a on the slide member 8 and having an arm 29 which is engageable with the locking lever 13 which, in the position as shown in FIG. 4, holds the locking lever in the unlocked position.

While the jaw openings of the upper and lower coupling hooks have been shown to be directed in the same direction, they may also be positioned so as to be directed toward each other.

Extending laterally outwardly from both sides of the carrier 10 and approximately as extensions of the bolt 5 are cross bars 15 to which struts 17 are pivotally connected at 16. The lower ends of the struts 17 are connected to the lower guide members 2, 3 by bolts 19 which fasten coupling hooks 18 to the lower guide members. The coupling hooks 18 also have a limited degree of three dimensional or universal movement with respect to the lower guide members 2, 3. A locking pawl 20 is pivotally mounted on each coupling hook 18 for blocking the jaw opening of the hook. The locking members 20 of the lower coupling hooks 18 are actuated simultaneously with the position fixing or locking hook 11 because of the interconnection by the operating line 26. As a result, during unlocking the upper coupling hook 7 will move in a direction away from the tractor while the locking lever is open and conversely, after operative engagement the spring loaded locking means of the coupling hook 7 will actuate the locking lever for longitudinal adjustment.

Each strut 17 comprises an outer tubular member 17a in which is telescopingly positioned an inner member 17b which is resiliently positioned therein by a spring 21. The upper end of spring 21 is attached to a pin 22 passing through the tube 17a. There are a plurality of bores 23 through the pin 22 and thus vary the vertical relationship of the upper coupling hook 7 to the lower coupling hooks 18. The relative spacing of the coupling hooks 18 may be adjusted by varying the angle between the struts and cross bars 15 by means of an arcuate number member 16a having a plurality of slots 25 therein engaged by locking latches 24a mounted on sliding sleeve 24. The sleeve 24 is slid away from arcuate member 16a to disengage latch 24a from notch 25 and thus permit pivoting of strut 17 around pivot connection 16 to a different angle. Latch 24a is then engaged into a new notch 25. The notches 25 provide for fixedly positioning of the lower guide members at different angles and thus at certain predetermined widths with respect to the upper guide member. A floating position for the lower guide members may be required with certain types of agricultural implements and machines such as mowing machines.

The lower end of strut element 17b is provided with bifurcations so as to be slidably positioned over the bolt 19. This is in the form of a rapid fastener or connected device which facilitates moving of the upper guide member out of the coupling region or out of the range of movement of the draw bar on a machine which is to be coupled to the tractor such as would be the case when the tractor is to be used to pull an implement by means of the traction bar. The rapid fastener or connecting devices between the lower ends of the strut elements 17b and the coupling hooks 18 will provide that the lower coupling hooks 18 are aligned approximately with respect to the position of the upper coupling hook 7 during the coupling operation.

Figure 3:
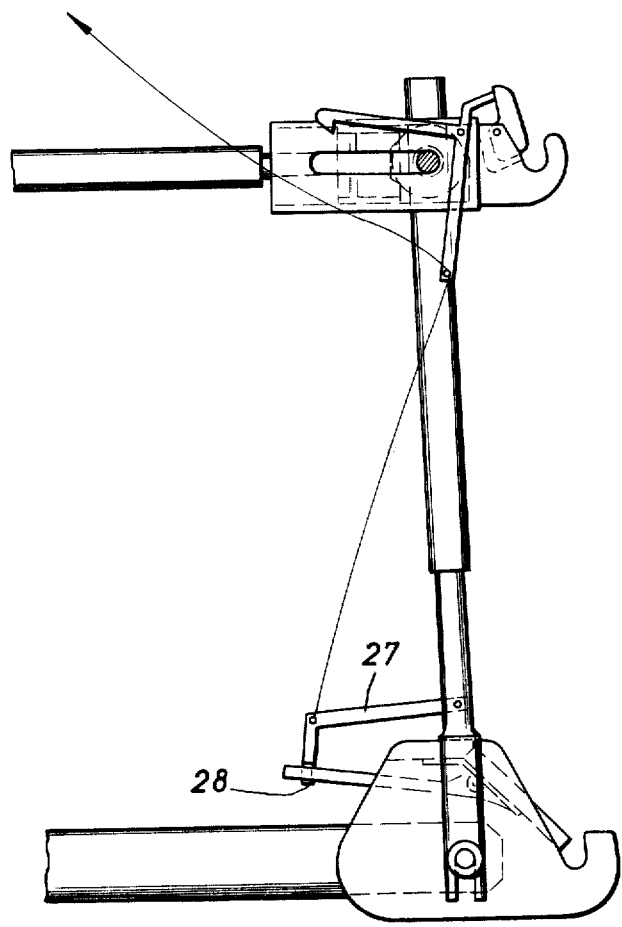
FIG. 3 is a view similar to that of FIG. 2 but showing a modification of the locking lever for a guide member coupling hook.

In order to eliminate the necessity of disconnecting the line 26 from the locking pawls 20 when the struts 17 are disconnected, there may be provided, as shown in FIG. 3, an operating lever 27 pivotally mounted on the strut and which has a hook 28 engagable beneath the actuating arm of the pawl 20.

The coupling hook assembly 7 which includes the slide member 8 and carrier 10 may also be slidably mounted on the cross bars 15 to provide for lateral movement of the upper coupling hook 7 to facilitate alignment with fasteners on certain types of working machines.

Figure 2:
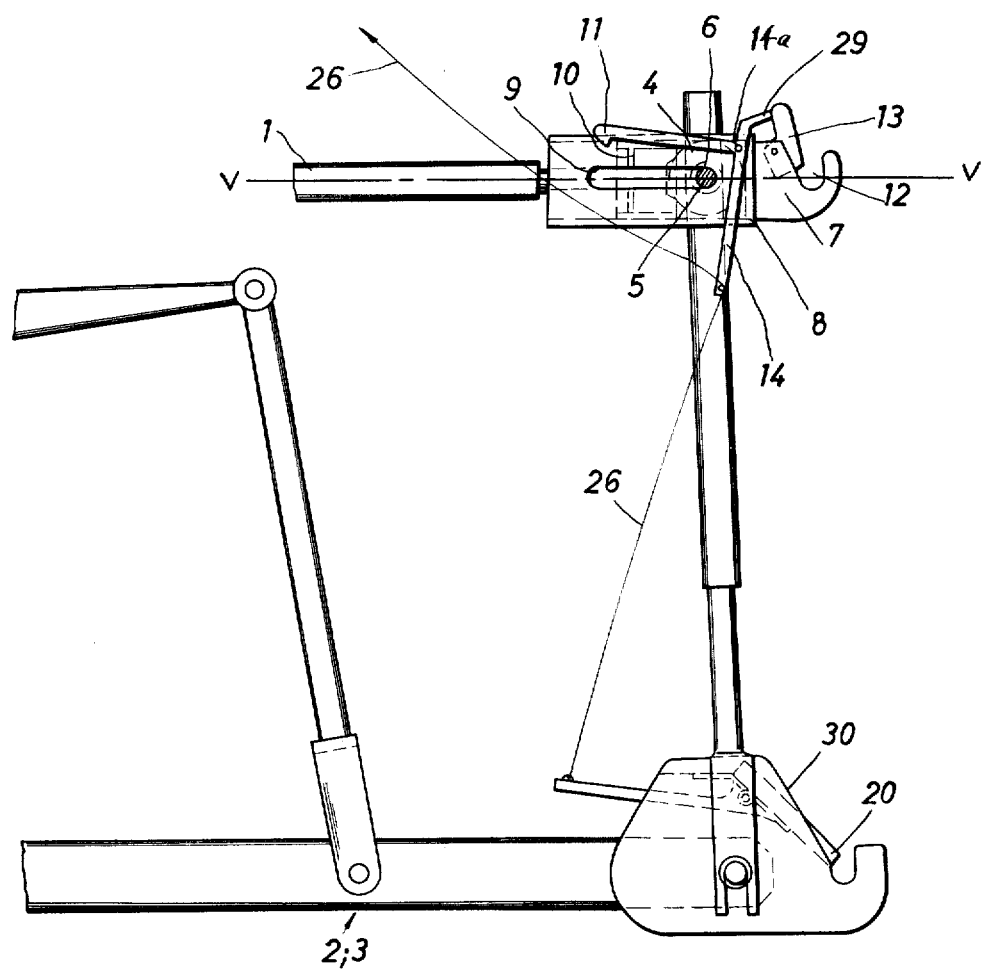
FIG. 2 is a sectional view taken along the line A—A of FIG. 1.

In FIG. 2, all of the components of the hitch are shown in their locking positions. In order to couple the hitch to the corresponding fastening devices on the machine, the line 26 must be pulled which in turn pivots the bracket 14 to disengage hook 11. At the same time, the locking lever 13 is cammed in a clockwise direction to the unlocking position by the lever arm 29 and the locking pawls 20 are also open. With the disengagement of locking hook 11, the hook 7 and the slide 8 are axially displaced on the carrier 10 under the influence of spring 32 in a direction toward the machine which is to be coupled. In this position, the upper hook 7 is now positioned forwardly, or toward the machine, with respect to the lower hooks 18. As the tractor is driven in the reverse direction and toward the machine to be coupled and by lowering and lifting the lower guide members 2, 3 by means of the power drive lift devices, the coupling hook 7 will approach the corresponding fastening device on the machine and because of its pivotable mounting will automatically align itself and at the same time align the lower coupling hooks 18 with the corresponding fastening devices. After the coupling hook 7 has engaged the corresponding fastening device the spring loaded locking element 13 will drop into position to locking the engaged coupling hook 7, the coupling hook 7 and slide 8 will be displaced with respect to the upper member 1 upon further reversing of the tractor until the locking hook 7 has engaged. The lower guide members 2 and 3 are then lifted because of their resilient connection to the upper guide member until the openings of the lower coupling hooks 18 engage their corresponding fastening devices. After the locking pawls 20 have been engaged, a full and complete locking engagement is achieved between the three-point hitch of the tractor and the working machine. The uncoupling or disconnecting operation occurs in the reverse sequence.

By maintaining a predetermined distance between the upper and lower guides it is possible for the coupling operation to be performed solely by a lift movement.

To carry out the coupling operation, the upper coupling hook is directed to the corresponding upper fastener on the machine by means of the lift devices connected to the lower guide members. Upon engaging and locking of the upper coupling hook, the lift devices and thus the lower guide members are lowered to a point beneath the lower fastening devices on the machine. Upon further reversing of the tractor, the lower guide members are raised until the lower hooks engage the corresponding fastening devices. The coupling hook 7 may be positioned with respect to the lower coupling hooks 18 at a distance which, before coupling to the machine, is less than the vertical distance between the fastening devices on the machine to be coupled.

The linkage may also be adjusted such that the vertical distance between the upper and coupling hooks is greater than the distance between the corresponding fastener devices on the machine. To carry out the coupling operation, the tractor is driven in reverse toward the machine and the upper coupling hook guided both by its lateral movability and lifting of the lower guide members until the upper coupling hook is engaged and locked with the corresponding fastener device. The lower guide members are raised still further since the resilient linkage permits relative movement between the upper and lower guide members. The coupling operation is completed after the lower coupling hooks are engaged and locked with the lower fastening devices on the machine.

Proceeding next to FIGS. 5-10 there is shown a modification wherein the upper guide member 1' is connected to the lower guide members (such as shown at 2, 3 in FIG. 1) by means of a resilient telescoping frame or linkage 100. At the end of the upper guide 1' there is provided a laterally movable upper coupling 7' the inner end of which is provided with a fork 34 which is pivotally mounted by a bolt 35 extending through an eye 42 on a base member or end plate 43. The opening 12' of the hook 7' is blocked or closed by a locking lever 13' urged into the locking position by a spring 31.

The locking lever 13' is pivoted at 37 and its other arm 38 is connected by an operating chain 39 which is actuated by a line or cable 26' in a manner to be presently described.

Connected to the base member 43 is a connecting tube 44 within which is accommodated a ratchet shaft 45 having a plurality of annular ratchet grooves 46 thereon. A split locking ring 47 encircles the shaft 45 near the base member 43 and has correspondingly shaped annular grooves therein. The ratchet shaft 45 is further provided with an axial bore 102 within which is a guide tube 48 surrounded by a ratchet spring 49 which is prestressed and extends outwardly of the axial bore in shaft 45 to abut a pin 51 passing transversely through shaft 45 as may be seen in FIG. 8.

A central alignment ring 50 centers the ratchet shaft 45 with respect to a cylindrical housing 52 within which are provided two pawl blocks 53 in mutually opposite relationship. The blocks 53 are provided with grooves 54 which are engagable with the annular grooves 46 on the ratchet shaft 45. The blocks 53 are movable toward and away from the ratchet shaft upon actuation of a pivotally mounted release lever 56 which acts upon inclined or cammed disengaging faces 54 on housing 52.

The lever 56 is connected to the pawl blocks 53 by bolts 58. The release lever 56 is provided with a gripping ring 57 to which is connected the operating chain 39. The upper coupling hook 7' is rotatable about its longitudinal axis since the pawl blocks 53 engaging the annular grooves 46 on ratchet shaft 45 permit a rotative movement of the connecting tube 44 with respect to the ratchet shaft 45. The locking in position by means of the pawl blocks 53 assures that the upper coupling hook 7' can withstand traction as well as thrust forces.

The end of the ratchet shaft 45 which is closest to the tractor merges into a cylindrical tubular sleeve 59 which is internally threaded. A spindle shaft 60 has its threaded end screwed into the sleeve 59 and at a distance of 40 mm. from the end of the threaded part of the spindle 60 there is provided an annular groove 61 which functions as an indicator or index for axial movement of the spindle 62 with respect to the sleeve 59. At the end of the spindle 60 is a ball joint 62 which is connected by means of a bolt (not shown) with the transmission of the tractor. A retaining clip 65 in combination with a joint plate 63 and a stop bar 64 acts as a stop to limit rotation of the spindle 60 with respect to the sleeve 59. The retaining clip 65 comprises a pair of spaced members the ends of which are pivotally mounted in two bores in the plate 63 which are eccentric with respect to the fulcrum of the clip 65. Clip 65 pivots over the stop bar 64 for locking and will remain in this clamping position under the action of the eccentric pivoting.

The horizontal distance between the upper catch hook 7' and the lower hooks 18' can be adjusted independently of other adjustments. This is done by unscrewing the spindle 60 to the desired position and then securing the spindle against rotation with respect to the housing 59 by the retaining clip 65. The indicator groove 61 defines the limit to which the spindle 60 should be unscrewed.

Welded to the underside of connecting tube 44 along the center line thereof is an adjustment rail 67 for connection to the telescopic frame 100. The frame comprises a beam consisting of a central portion 72 and extension members 76 telescopingly received therein and extending from both ends thereof. A connection member in the form of a U-shaped clamp 68 is attached to the adjusting rail 67 by a pin 69 and connected to the frame central portion 72 by means of a pin 71 secured in position by a resilient pin 70. In order to position the connection member 68 and to limit the clearance between this connection member and the central portion 72 of the frame 100 there are provided a pair of guide bars 73 welded to the upper side of the central portion 72. The extension members 76 each contain a plurality of adjustment openings 22' and these members are secured in the central portion 72 by spring pins 75.

The frame 100 also comprises angle members 79 each of which comprises a connecting plate 80 to which is fastened a spacer element 78 and an absorber 77 to receive the ends of the extension members 76. An outer tube 81 is also mounted on the angle member 79 and is provided with a supporting member 83 for a latch 82. The latch 82 is engagable with notches or recesses 84 provided on an inner tube 85 on the upper end of which is provided an abutment ring 86 surrounding a guide rod 88. A lower stop ring 87 is provided on the bottom end of the rod 88 and a spring 21' acts between the abutments 86 and 87. Outwardly of the abutment 87 the rod 88 is bent at a right angle to form a connecting shaft or bolt 89 upon which the lower coupling hooks 18' are mounted and retained in place by pins 90.

Within a hollow space 91 in the lower coupling 18 a compression spring 92 is positioned between the lower guide member and a wall of recess 91. A lower extension of recess 91 is provided with a bore 93 for receiving the connecting bolt 89. The inner space of the coupling hook is connected with the lower guide member by means of a pin 94.

The opening 12' of the coupling hook 18' is closed by a spring-loaded locking lever 20' which is maintained in its locking position by a tension spring 96. The lever is pivoted at 95 and is provided with an eye 98 which is connected to the operating line 26. A bore 97 receives a safety peg which limits the pivoting movement of the lever. A spacer member 99 is provided to allow adjustment to different heights of the lower guide members.

Figure 5:
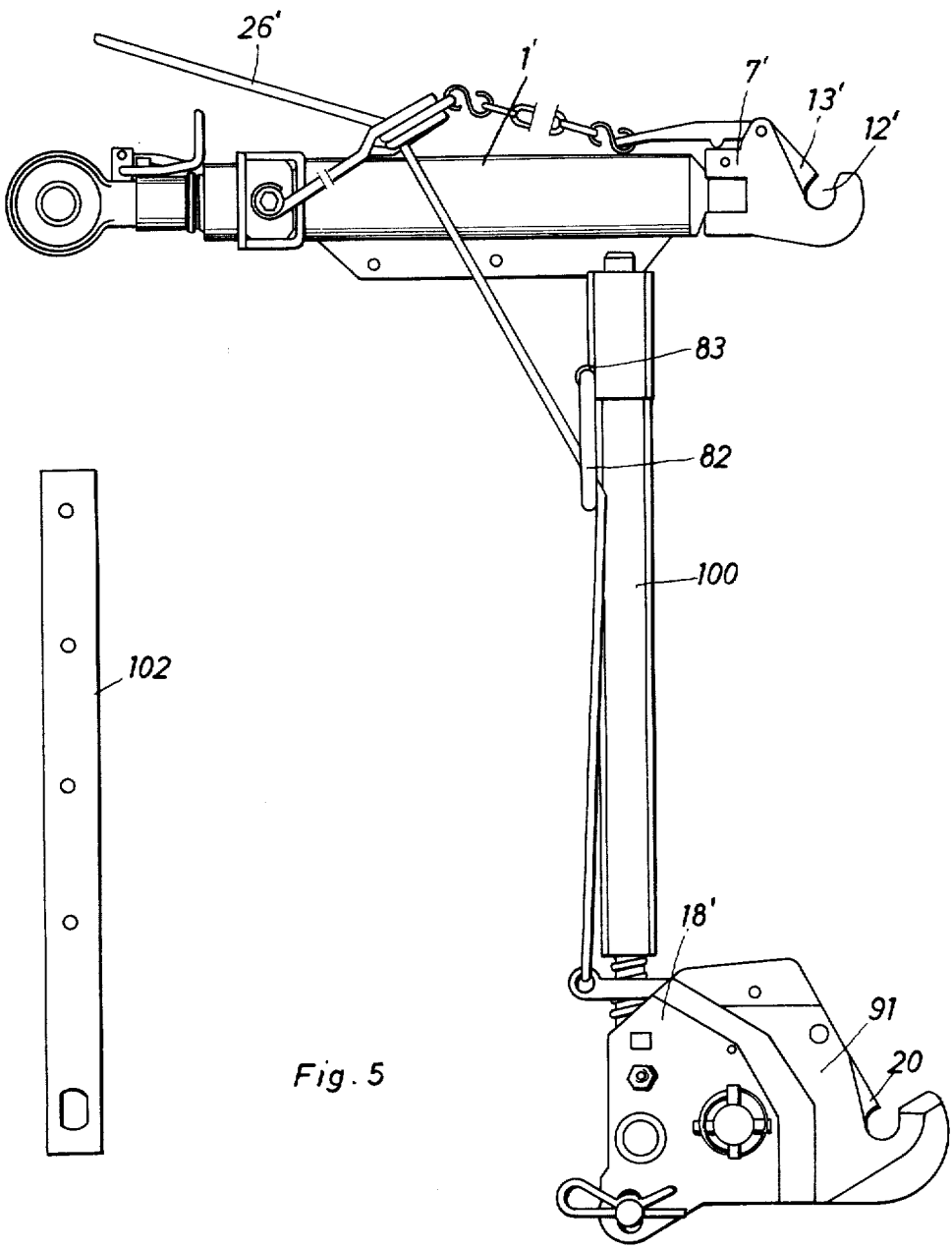
FIG. 5 is a side elevational view of a modification of a three-point hitch.
Figure 6:
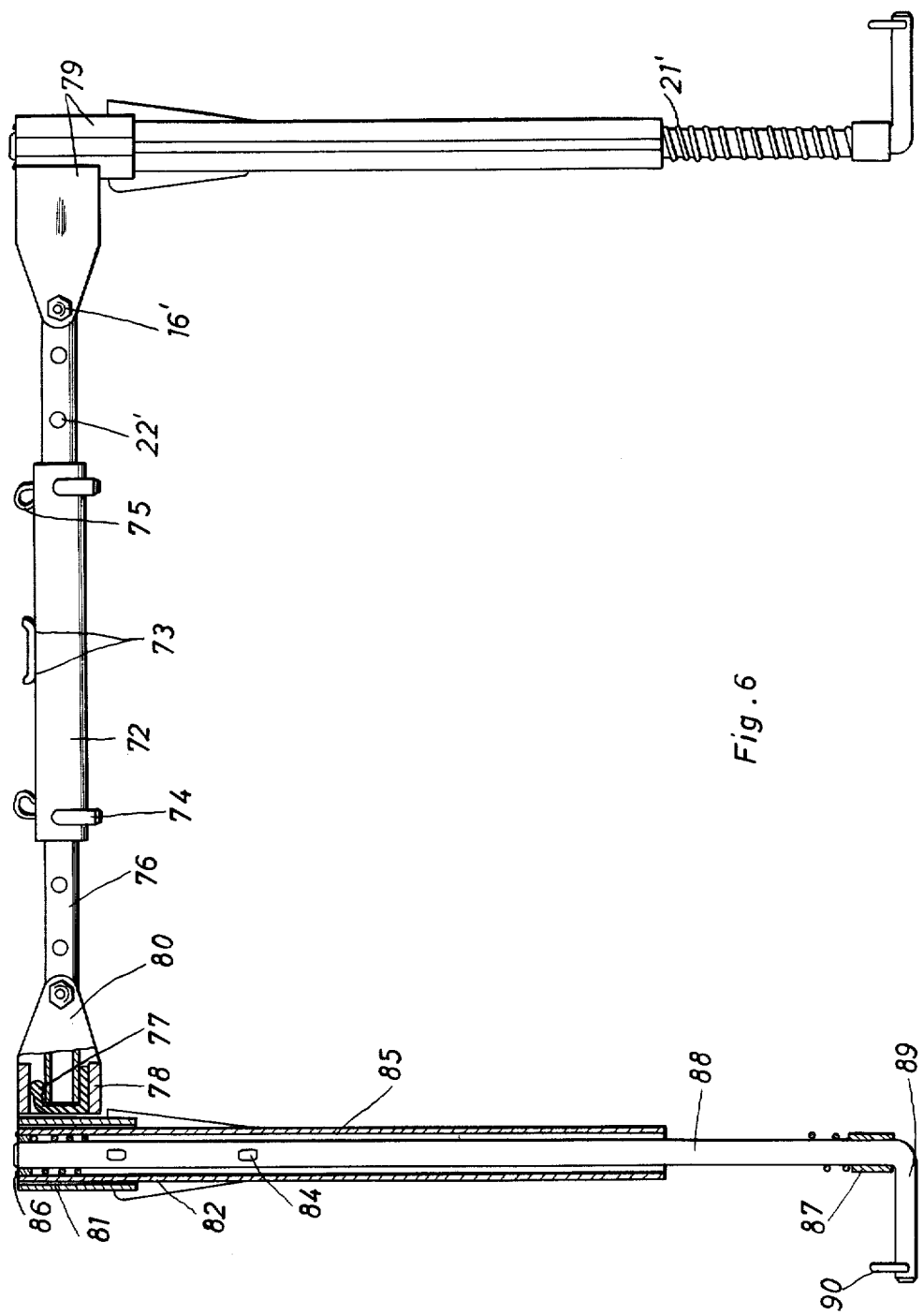
FIG. 6 is an end elevational view of the hitch shown in FIG. 5.
Figure 7:
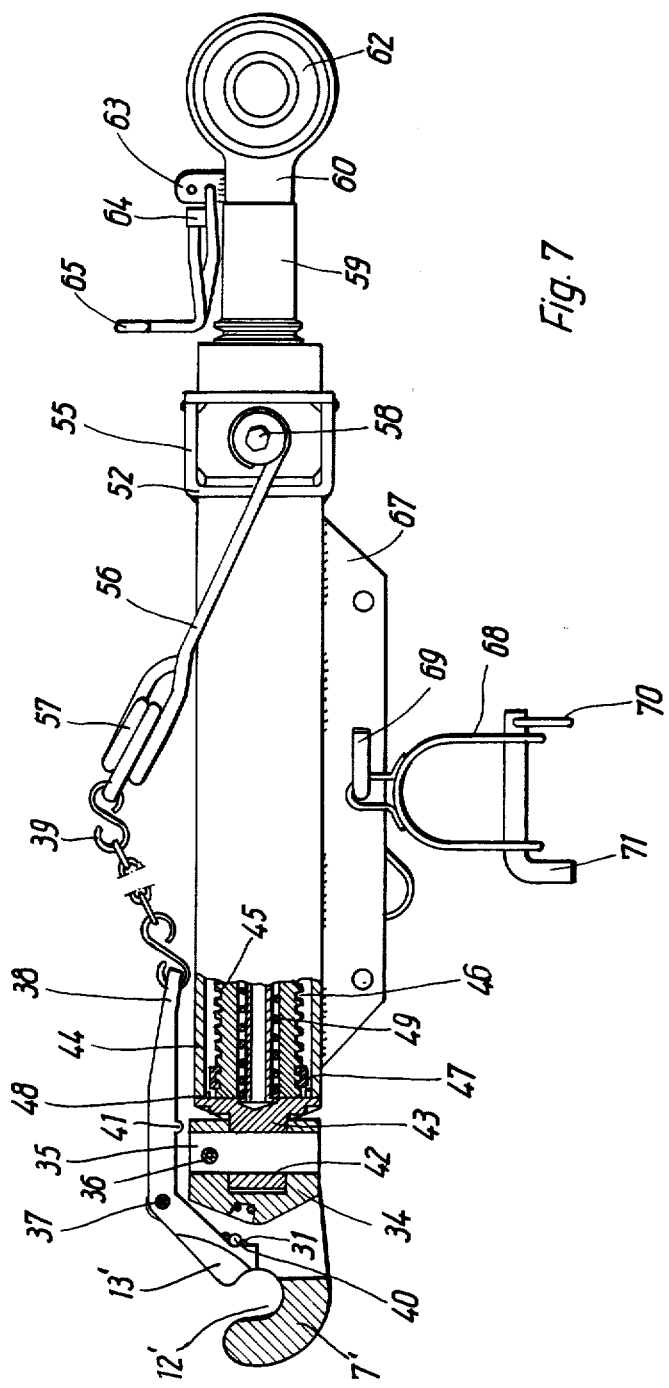
FIG. 7 is a side elevational view, partially in section, of the upper guide member and coupling hook.
Figure 8:
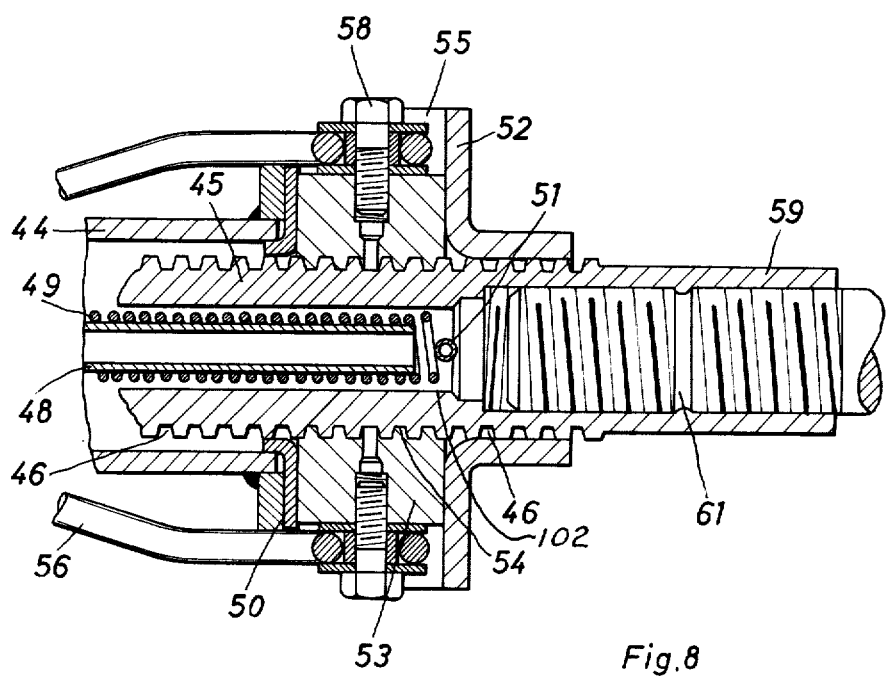
FIG. 8 is a horizontal sectional view through the end portion of the housing of FIG. 7.
Figure 9:
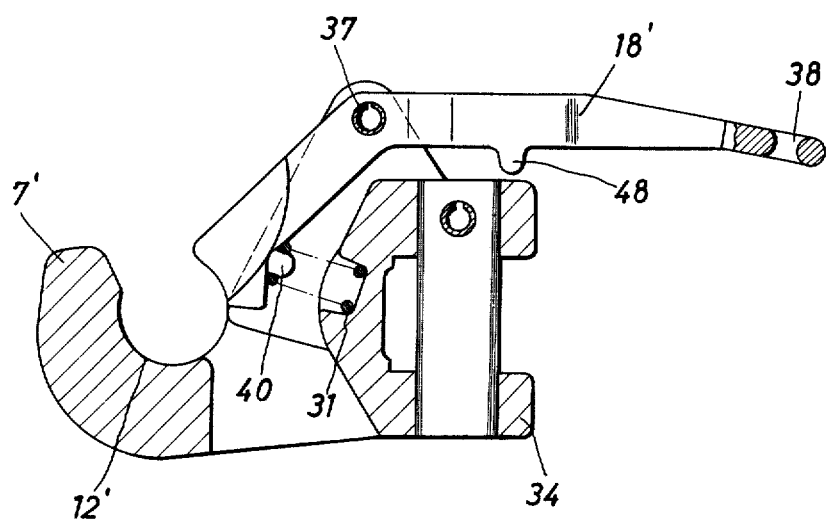
FIG. 9 is a vertical sectional view through the upper coupling hook of FIG. 7 and showing the locking lever.
Figure 10:
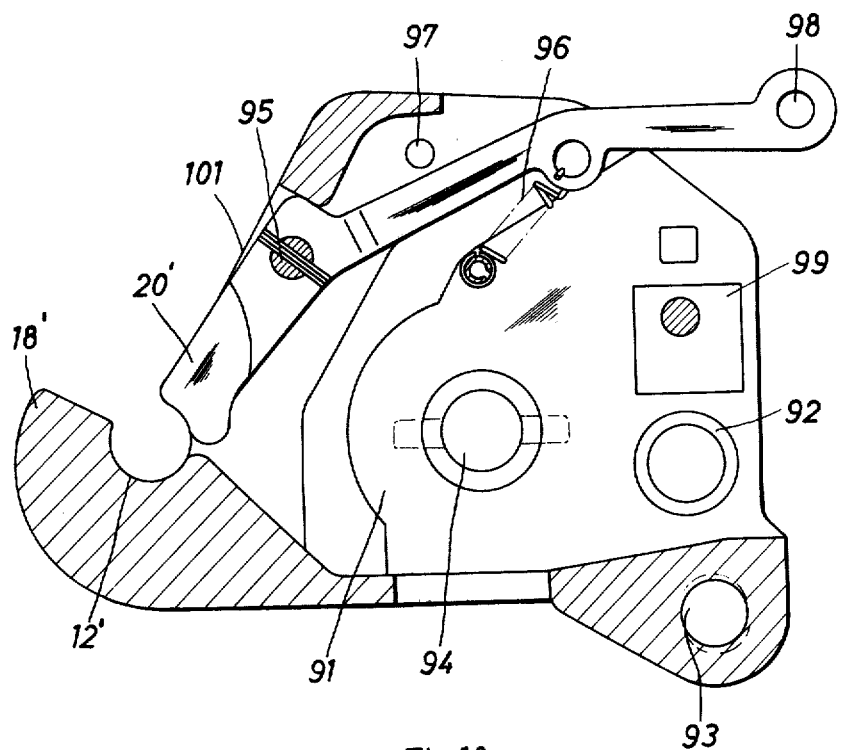
FIG. 10 is a vertical sectional view through a lower coupling hook and showing the locking lever.

All of the components are shown in the locking position in FIG. 5. To carry out the coupling operation, the line 26' is actuated by the driver of the tractor. Pulling the line 26' will pivot release lever 56 so as to disengage the pawl blocks 53 from the ratchet grooves 46. Under the force of ratchet spring 49, the disengaged upper catch hook 7' will be moved outwardly in the direction toward the machine to be coupled. At the same time, the locking levers 20' of lower coupling hooks 18' are opened and shortly thereafter the locking lever 13' of the upper coupling hook 7' is also unlocked. This sequence of unlocking operations is achieved by a suitably determined play in the line 26 between the three locking devices. This is necessary to assure that the upper coupling hook 7' will be extended in the direction toward the coupling point of the machine during the first stage of the coupling operation.

With the upper coupling hook 7' located forwardly of the lower coupling hooks 18' or closest to the machine, the upper fastening device of the machine can now be connected to the upper hook 7'. As a result of a slight loosening of the line 26 the spring loaded locking lever 13' will drop into its engaged position to secure the corresponding upper fastening device of the machine within the hook 7'.

As the tractor continues in its reverse direction toward the working machine, the lower guide members 2', 3' are suitably raised and lowered by the power drive connected lifting rams to align the upper coupling hook 7' because of its pivotal mounting. At the same time, the lower coupling hooks 20' will become aligned with the corresponding fastener devices on the machine.

Further movement of the tractor in the reverse direction will cause the upper coupling hook 7' and connecting tube 44 to be axially moved with respect to the ratchet shaft 45 until the pawl blocks 53 engage in the annular ratchet grooves 46 of the shaft 45. Upon further raising of the lower guide members which is possible since these members are resiliently mounted with respect to the upper guide member, the fastening bolts on the machine will be attached to the tractor by camming along the faces 101 of the lower coupling hooks 18'. Each locking lever 20' is then dropped into locking engagement with the fastener devices and a complete and safe locking connection is assured between the working machine and the three-point hitch.

The uncoupling or disengaging operation with respect to the tractor and working machine is carried out in the reverse sequence of steps.

Thus it can be seen that according to the present invention, the supporting structure or linkage between the upper and lower guides is not subjected to any loads since very little, if any, forces are applied to the working machine as the tractor approaches the upper fastening device on the machine. Further, not only does the present hitch provide a reliable and secure coupling connection between the tractor and the machine but also insures a safe and reliable uncoupling of the machine because the construction and pivotal mounting of the upper coupling hook no longer requires a strict operational sequence in performing the steps of the uncoupling operation. The coupling hook itself is not subjected to any stresses and is the first component to be free of the corresponding fastening device on the working machine. Thus, all stresses and tensions on the hitch are relieved and facilitate the freeing of the other couplers. The pivotability of the upper guide member coupling hook about its longitudinal axis significantly facilitates the central alignment of this upper coupling hook with respect to the upper fastener on the working machine. In addition, the upper guide member is capable of lateral and vertical pivoting. The lateral movement can be attenuated by means of buffer springs or the like.

The coupling and uncoupling operations require no additional power means except for using the conventional hydraulic lift devices provided for the lower guide members. The coupling and uncoupling operations can be readily performed without the necessity of the operator leaving the tractor's seat, since it is no longer necessary for the operator to make a preliminary alignment and final connection by hand. However, the present hitch does provide for the coupling operation to perform manually if so desired. The hitch according to the present invention does not require a certain predetermined sequence of operations in either coupling or uncoupling as would be the case with a prior art hitch wherein the central alignment involves a lifting function.

It will be understood that this invention is susceptible to modification in order to adapt it to different usages and conditions, and accordingly, it is desired to comprehend such modifications within this invention as may fall within the scope of the appended claims.

What is claimed is:

1. A three-point hitch for tractors comprising an upper guide member of variable length including a carrier member, cross bars mounted on said carrier member, a pair of lower guide members below said upper guide member, linkage means pivotally connected to said cross bars for interconnecting said upper and lower guide members, coupling hooks on each of said lower guide members and said carrier member, and said linkage means including means for resiliently supporting said upper guide member in spaced but relatively moveable relationship to said lower guide members.

2. A three-point hitch as claimed in claim 1 wherein the upper guide member coupling hook is pivotally mounted on said carrier member.

3. A three-point hitch as claimed in claim 1 and means for axially positioning said upper guide member hook with respect to the longitudinal axis of said upper guide member.

4. A three-point hitch as claimed in claim 1 wherein said carrier member includes a movably mounted a tubular slide member and said coupling hook mounted on said slide member so that said hook is adjustable axially.

5. A three-point hitch as claimed in claim 3 and means for retaining said upper guide member hook in at least one position in which said hook can withstand only traction forces.

6. A three-point hitch as claimed in claim 4 wherein said cross bars extending outwardly from opposite sides of said slide member.

7. A three-point hitch as claimed in claim 1 and comprising locking means on said coupling hooks, means for retaining said upper guide member hook in at least one position in which said hook can withstand traction forces, and means for actuating simultaneously said locking means and said hook retaining means.

8. A three-point hitch as claimed in claim 4 and spring means connected between slide member and said carrier member.

9. A three-point hitch as claimed in claim 4 and cross bars extending laterally in opposite directions from said upper guide member, said slide member being adjustably mounted on said cross bars.

10. A three-point hitch as claimed in claim 1 and comprising a connecting tube on said upper guide member, said upper guide member hook having a fork joint and pivotally mounted on said tube for pivoting movement about an axis transverse to the opening of said hook.

11. A three-point hitch as claimed in claim 1 and a beam comprising a central portion and extension members protruding from both ends thereof, means for connecting said upper guide member to said central portion, and means including a telescoping tube and an angle member for connecting said extension members to said lower guide members.

12. A three-point hitch as claimed in claim 11 and means for pivotally connecting said extension members to said angle members, and means for limiting the relative movement between said extension members and said angle members.

13. A three-point hitch as claimed in claim 7 wherein said locking means on said upper coupling hook comprises a lever pivotally mounted on said hook such that an arm of said lever lockingly secures an element disposed in the hook opening, and an operating chain connected to the other arm of said lever.

14. A three-point hitch as claimed in claim 1 and a connecting tube on said upper guide member, a ratchet shaft within said connecting tube, pawl means movably mounted on said connecting tube and engagable with said ratchet shaft to position such shaft with respect to said connecting tube, and an operating lever on said connecting tube and disengaging said pawl means from said ratchet shaft upon pivoting movement of said operating lever.

15. A three-point hitch as claimed in claim 14 and a spindle shaft threadedly engaged within the end of said ratchet shaft away from said coupling hook, and means on said spindle shaft for retaining said spindle shaft against rotation within said ratchet shaft and spring means within said ratchet shaft bearing against a portion of said connecting tube and against a portion of said ratchet shaft to urge said ratchet shaft away from said coupling hook upon disengagement of said pawl means.

16. A three-point hitch as claimed in claim 15 and an annular indicator means on said spindle shaft to define the limit of axial movement of said spindle shaft with respect to said ratchet shaft.

17. A three-point hitch as claimed in claim 10 and comprising a frame interconnecting said lower guide members, and adjustable bar means adjustably fastening said connecting tube with said frame.

18. A three-point hitch as claimed in claim 1 wherein said linkage means has at its pivotal connection an arcuate member with a plurality of notches therein; a slidable sleeve on each of said cross bars and having a locking latch thereon engageable with one of said notches to lock in position the width adjustment of said lower guide members.

* * * * *